Jan. 31, 1967  H. T. PROBASCO  3,301,620
DISPENSING APPARATUS

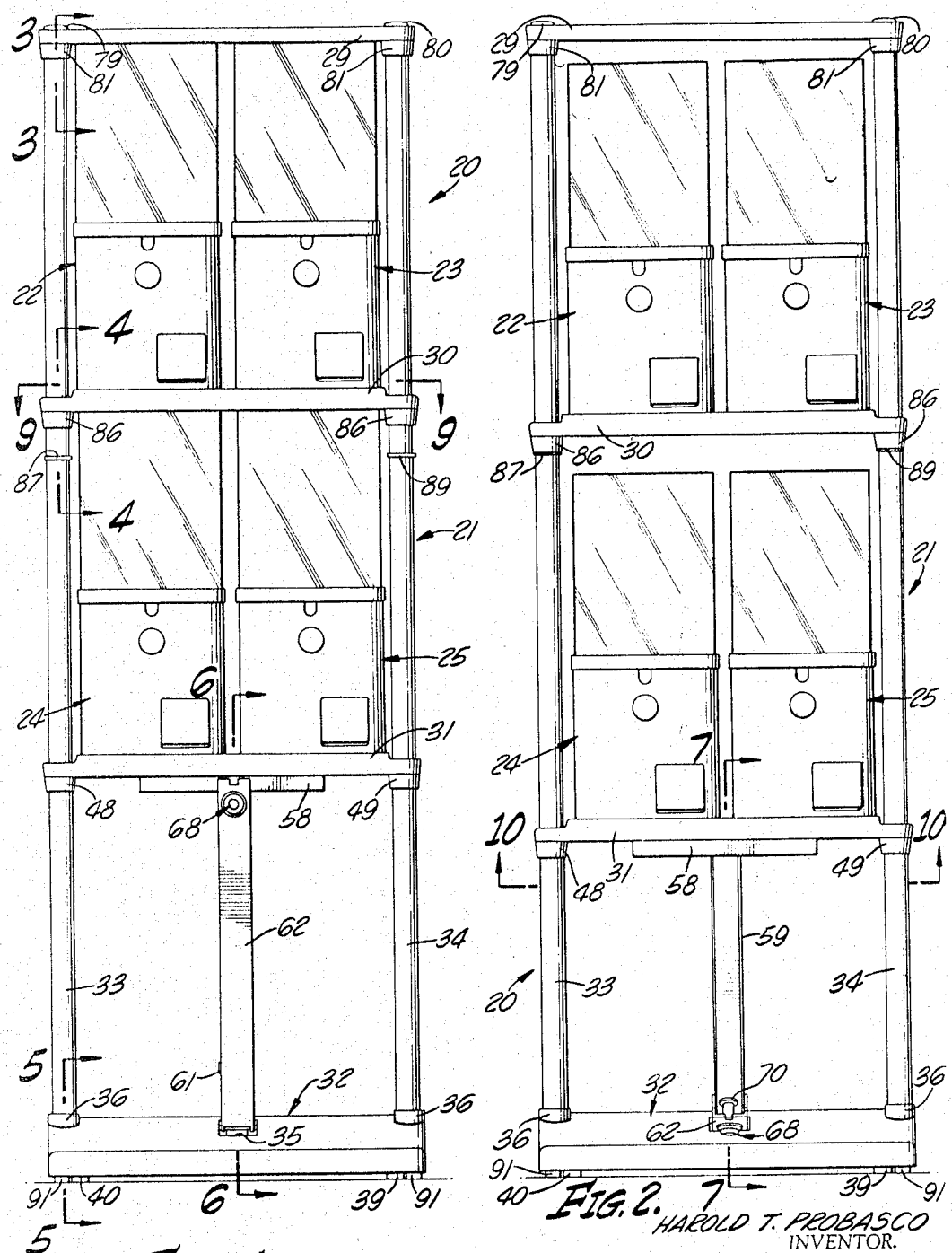

Filed Feb. 21, 1966  4 Sheets-Sheet 2

HAROLD T. PROBASCO
INVENTOR.

KENDRICK AND STOLZY
BY
ATTORNEYS

Jan. 31, 1967    H. T. PROBASCO    3,301,620
DISPENSING APPARATUS
Filed Feb. 21, 1966    4 Sheets-Sheet 4

HAROLD T. PROBASCO
INVENTOR.

KENDRICK AND STOLZY
BY
ATTORNEYS

United States Patent Office 3,301,620
Patented Jan. 31, 1967

3,301,620
DISPENSING APPARATUS
Harold T. Probasco, Los Angeles County, Calif.
(6531 Noble Ave., Van Nuys, Calif. 91401)
Filed Feb. 21, 1966, Ser. No. 528,701
9 Claims. (Cl. 312—201)

This invention relates to devices for delivering merchandise at a manually accessible location, and more particularly to vending machines or the like, and stand therefor.

This application is a continuation-in-part of copending application Ser. No. 417,185, filed Dec. 9, 1964, by the inventor hereof for Dispensing Apparatus, now abandoned. The benefit of the filing date of said copending application is therefore hereby claimed for this application as to the subject matter common to both of said applications.

Although the present invention will have many other uses and should not be limited to those specifically disclosed herein, the invention has been found to possess exceptional utility when employed in the construction of coin operated vending machines and assemblies thereof in stands also constructed in accordance with the present invention.

In the past, it has been the practice to mount a vending machine in a fixed position on a stand. Such a machine is serviced while it is fixed to the stand. This arrangement makes it difficult to service the machine because the stand is usually relatively heavy and difficult to move, if the machine must be moved. Such machines also have merchandise receptacles covered with a lid. Thus, in a group of such machines, it is always necessary to take time to unlock each lid of each machine one at a time in order to clean and to refill the merchandise receptacle which each lid covers.

In accordance with the present invention, the above-described and other disadvantages of the prior art are overcome by providing a vending machine having an open receptacle at one end. A structure such as a stand is then provided to hold the machine between a pair of plates. The plates may be locked in position with a key. Thus, the machine may be closed and, at the same time, it is made pilfer proof.

It is an outstanding feature of apparatus constructed in accordance with the present invention that several machines may be closed and locked in place contemporaneously.

It will be seen that the apparatus of the invention is economical to manufacture. Further, vending machines of the present invention may be wholly separated from their stand in order that they may be easily serviced both rapidly and efficiently. The more or less ganged opening and closure of two or more machines also has these same advantages in servicing.

The above-described and other advantages of the present invention will be better understood from the following description when considered in connection with the accompanying drawings.

In the drawings which are to be regarded as merely illustrative:

FIG. 1 is a front elevational view of an assembly of a vending machcine and vending machines thereon constructed in accordance with the present invention;

FIG. 2 is a front elevational view of the stand with the vending machines in an unlocked position;

Dispensing apparatus 20 is shown in FIG. 1 including a vending machine stand 21 and four identical vending machines 22, 23, 24 and 25.

Figure 12:
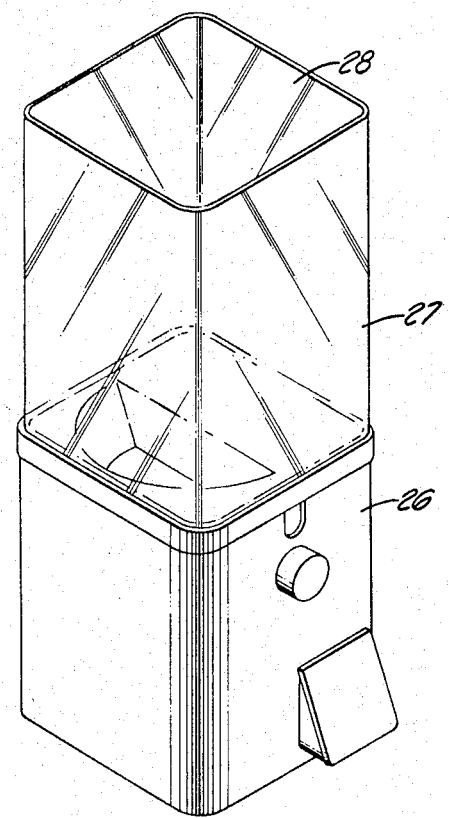
FIG. 12 is a perspective view of one of the vending machines shown in FIGS. 1 and 2.

All of the vending machines may be completely conventional. For example, they may have a base as indicated at 26 in FIG. 12 and a merchandise receptacle 27. It is conventional to provide a merchandise receptacle such as receptacle 27 having an open upper end at 28. However, the upper end of receptacle 27 is conventionally covered by a plate which is of a size approximately equal to the size of the upper end of the receptacle 27. This plate slips over the upper end of the receptacle and is conventionally locked in place there. However, in accordance with the apparatus of the present invention, no such conventional top or cover plate for receptacle 27, or for any of the receptacles of vending machines 22, 23, 24 and 25 are provided. In lieu thereof, upper, intermediate and lower plates 29, 30 and 31, respectively, are provided. Lower plate 31 is provided to support all of the vending machines 22, 23, 24 and 25 and to support intermediate plate 30.

The upper, intermediate and lower plates 29, 30 and 31 are integral parts of the vending machine stand shown in FIG. 1. Stand 21 also has a base 32 to which cylindrical vertical tubes 33 and 34 are fixed to act as posts.

Figure 11:
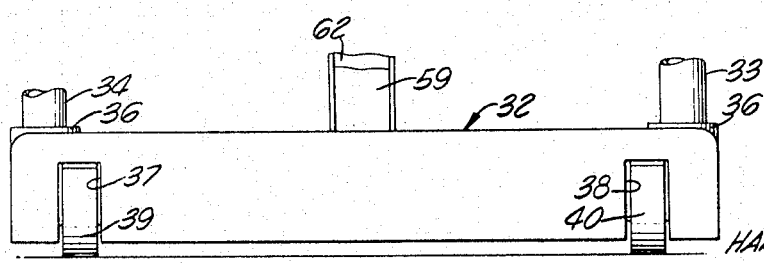
FIG. 11 is a rear elevational view of the stand base.

The cross section of base 32 is generally trapezoidal. It is interrupted by a sloping well of a uniform width as indicated at 35 in FIGS. 1 and 7. It is also interrupted by a pair of identical cylinders 36 which receive the lower ends of tubes 33 and 34. Cylinders 36 are cast integrally with base 32. Base 32 also has slots at 37 and 38, as shown in FIG. 11 through which wheels 39 and 40, respectively, project. Wheels 39 and 40 are mounted in conventional clevis type brackets 41 which are fixed to base 32. Wheels 39 and 40 are, in themselves, conventional.

Figure 5:
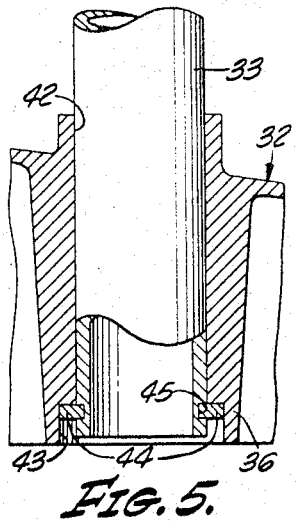
FIG. 5 is a sectional view of the stand taken on the line 5—5 shown in FIG. 1.
Figure 10:
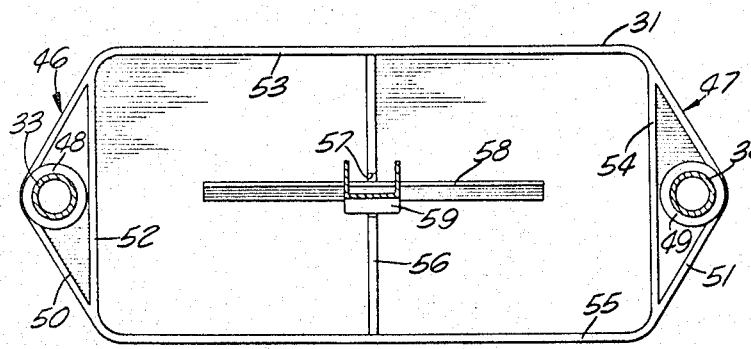
FIG. 10 is a sectional view of the stand taken on the line 10—10 shown in FIG. 2.

As shown in FIG. 5, tube 33 is mounted in cylinder 36. Tube 34 is similarly mounted and its mounting in base 32 therefore will not be described further. Cylinder 36 has a bore 42 which has a diameter at the top of cylinder 36 smaller than its bore at the bottom thereof. Cylinder 36 also has a counter bore at 43. A pair of semi-circular retaining rings 44 are driven into the joint between counter bore 43 and in an annular groove 45 which is provided in the external surface of tube 33. As stated previously, the vending machines and intermediate plate 30 are supported on lower plates 31 as shown in FIG. 10. Plate 31 has ears at 46 and 47 that have cylinders 48 and 49, respectively, cast integrally therewith. Cylinders 48 and 49 surround and are slidable vertically on tubes 33 and 34, respectively.

Figure 9:
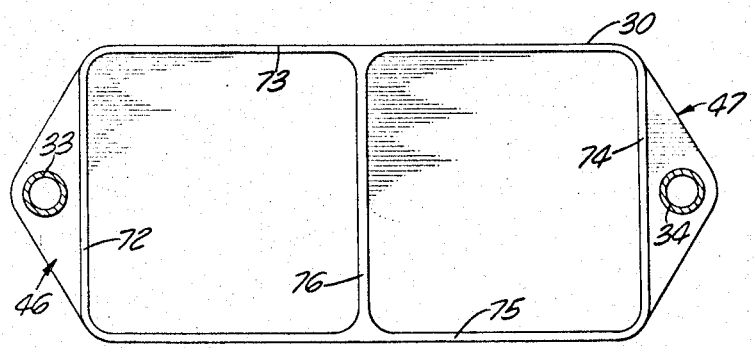
FIG. 9 is a sectional view of the stand taken on the line 9—9 shown in FIG. 1.

The top view of lower plate 31 is identical to the top view of intermediate plate 30 shown in FIG. 9. Similarly, the bottom view of lower plate 31 shown in FIG. 10 is identical to the bottom view of intermediate plate 30, not shown. In other words, plates 30 and 31 are identical. Further, the bottom plan view of upper plate 29 is identical to the bottom plan view of lower plate 31 shown in FIG. 10.

As shown in FIG. 10, ears 46 and 47 have strengthening flanges at 50 and 51, respectively. Flanges at 52, 53, 54, 55 and 56 are provided on the lower side of lower plate 31. Flanges on upper plate 29 corresponding to lower plate flanges 52 to 56 are provided to encompass the open ends of receptacles 27 of vending machines 22 and 23. Flanges on intermediate plate 30 corresponding to lower plate flanges 52 to 56 closely encompass the upper open ends of receptacles 27 of vending machines 24 and 25.

In the case of lower plate 31, flanges 52 to 56 simply strengthen plate 31. Flange 56 does have a notch 57 therein to receive a steel cross bar 58 which supports plate 31.

Figure 7:
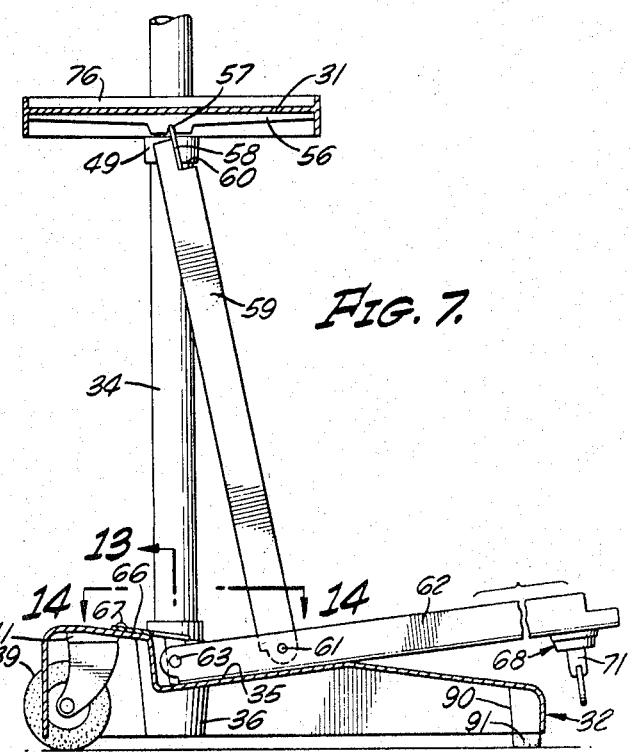
FIG. 7 is a sectional view of the stand taken on the line 7—7 shown in FIG. 2.

As shown in FIGS. 7 and 10, cross bar 58 is welded to a steel U-shaped channel 59 that is notched at 60.

As shown in FIG. 7, the lower end of channel 59 is rotatably mounted about a pin 61 that, in turn, is mounted through channel 62.

Figure 14:
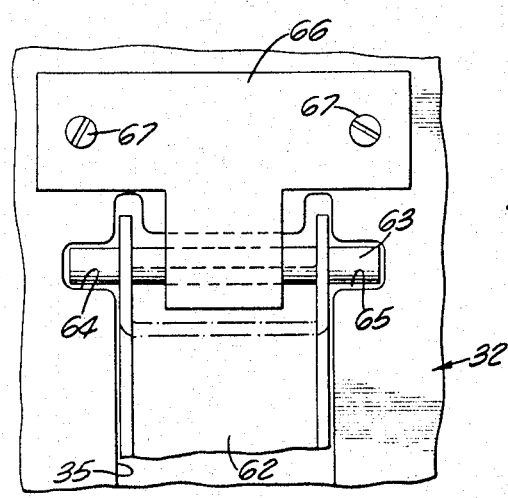
FIG. 14 is a top plan view of a portion of the stand base taken on the line 14—14 shown in FIG. 7.

As shown in FIGS. 7 and 14, channel 62 is rotatably mounted about a pin 63 that rests in wells 64 and 65 that communicates with sloping well 35.

Figure 13:
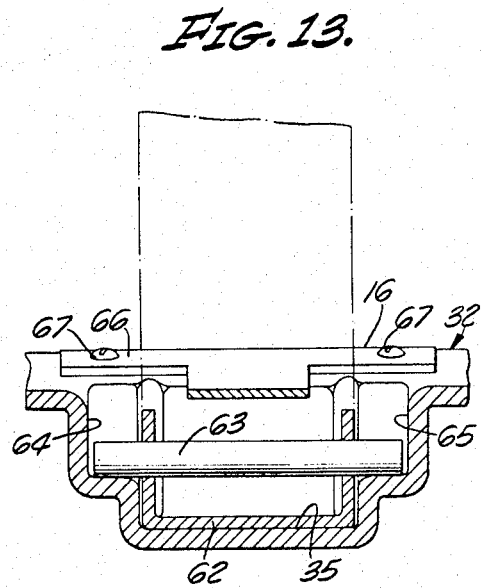
FIG. 13 is a sectional view of the stand taken on the line 13—13 shown in FIG. 7.

As shown in both FIGS. 13 and 14, pin 63 is retained in place by a T-shaped plate 66 that is fixed to base 32 by screws 67.

Figure 6:
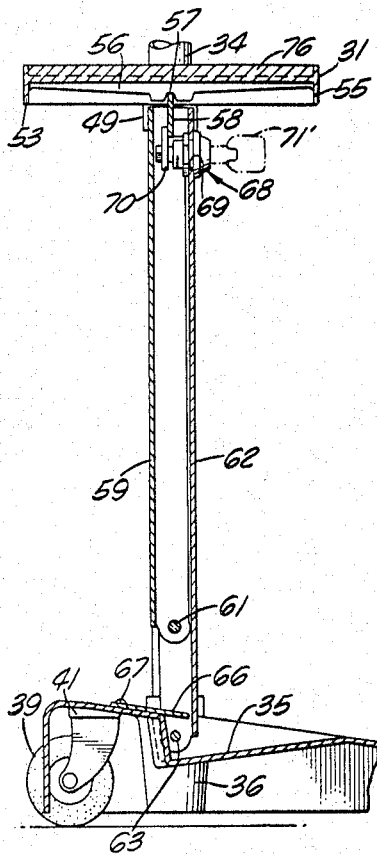
FIG. 6 is a sectional view of the stand taken on the line 6—6 shown in FIG. 1.

From the foregoing, it is now apparent that access to vending machines 22, 23, 24 and 25 is made by unlocking a lock 68 shown in FIG. 6 and rotating channel 62 to the position shown in FIG. 7. This spaces vending machines 22, 23, 24 and 25 from upper and intermediate plates 29 and 30 as shown in FIG. 2.

The relative positions of channels 59 and 62, when the vending machines are closed as shown in FIG. 1, are shown in FIG. 6. Note will be taken that lock 68 is mounted through a hole 69 in channel 62. Lock 68 and its manner of mounting is conventional. Note will be taken that lock 68 has an eccentric plate 70 which fits behind cross bar 58 in the locked position shown in FIG. 6. Lock 68 is operative by means of a key 71 shown in FIG. 7. The position of key 71 in lock 68 in its locked position is indicated in dotted lines at 71' in FIG. 6.

Intermediate and lower plates 30 and 31 are slidable on tubes 33 and 34 in similar manners.

As shown in FIG. 9, the upper side of intermediate plate 30 has flanges at 72, 73, 74, 75 and 76 similar to flanges 52 to 56 on the lower side thereof and on the lower sides of lower plate 31. Flanges 72 to 76 closely surround bases 26 of vending machines 22 and 23. Flanges on lower plate 31 corresponding to intermediate plate flanges 72 to 76 closely surround bases 26 of vending machines at 24 and 25.

Figure 3:
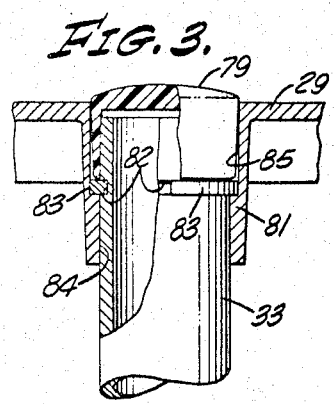
FIG. 3 is a broken away sectional view of a portion of the stand taken on the line 3—3 shown in FIG. 1.

Upper plate 29 is held in a fixed position on tubes 33 and 34 in a manner shown in FIG. 3. The mounting of plate 29 on tube 33 is shown in FIG. 3. The mounting of plate 29 on tube 34 is identical to that shown in FIG. 3 and will therefore not be described in detail for this reason.

Figure 8:
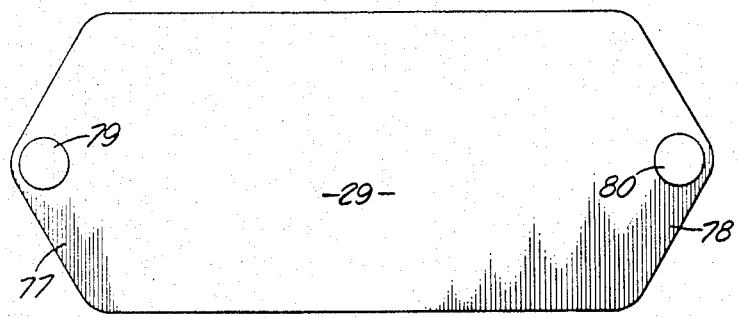
FIG. 8 is a top plan view of the stand.

As shown in FIG. 8, plate 29 has ears at 77 and 78. Tubes 33 and 34 would project through ears 77 and 78. However, the upper ends of tubes 33 and 34 are covered by rubber caps 79 and 80, respectively.

As shown in FIG. 3, plate 29 has a sleeve 81 integral therewith through which tube 33 is slidable. The upper end of tube 33 has an annular groove 82 therein to receive a split ring 83. Cylinder 81 has a bore 84 through which tube 33 projects. Cylinder 81 is pulled upwardly to the top of tube 33 and has a counter bore at 85 that surrounds both the upper end of tube 33 and split ring 83. In the assembled position shown in FIG. 3, ring 83 is under compression. Its expansion force keeps upper plate 29 from sliding down tubes 33 and 34 when stand 21 is in the open position shown in FIG. 2.

Figure 4:
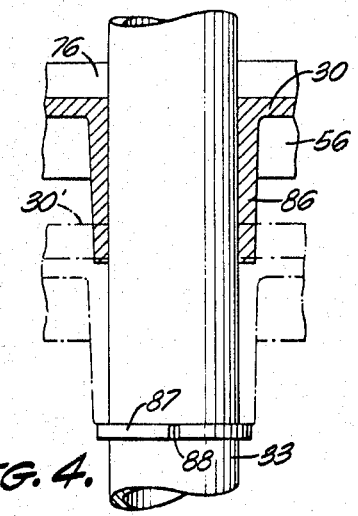
FIG. 4 is a sectional view of the stand taken on the line 4—4 shown in FIG. 1.

As shown in FIG. 4, plate 30 has cylinders 86 which surround tubes 33 and 34. A split ring 87 is located below cylinder 86. Ring 87 is located in an annular groove 88 in tube 33. When plate 30 moves from the position shown in FIG. 1 to the position shown in FIG. 2, cylinder 86 will rest upon ring 87. A similar ring 89 is mounted in an identical manner around tube 34. The position of plate 30, as shown in FIG. 2, is represented in dotted lines at 30' in FIG. 4.

As shown in FIG. 7, a pair of cylinders 90 are cast integrally with base 32 at the forward corners of base 32 to receive rubber pads 91 in a conventional manner.

In the operation of the dispensing apparatus of the present invention, with vending machine receptacles 27 full of merchandise, the stand 27 is closed to the position shown in FIG. 1 and lock 68 operated by key 71 to place plate 70 behind bar 58. In this case, removal of the vending machines from said stand 21 is prevented by flanges 72 to 76 on intermediate plate 30 and corresponding flanges on lower plate 31. Removal of the vending machines is also prevented by flanges corresponding to flanges 52 to 56 on upper and intermediate plates 29 and 30. Further, access to the upper ends 28 of vending machine receptacles 27 is prevented by the closely surrounded flanges of upper and intermediate plates 29 and 30.

For service, lock eccentric 70 is turned by key 71 so that channel 62 may be rotated from the position shown in FIG. 6 to the position shown in FIG. 7. In turn, this lowers lower plate 31 which is supported on bar 58 in notch 57 of lower plate flange 56. It will be recalled that bar 58 is welded to channel 59 which, in turn, is pivoted from channel 62 at pin 61.

When channel 62 is rotated from the position shown in FIG. 6 to the position shown in FIG. 7, lower plate 31 is lowered from the position shown in FIG. 1 to the position shown in FIG. 2. At the same time, all vending machines 22, 23, 24 and 25 with intermediate plates 30 are lowered simultaneously until intermediate plate cylinders 86 rest upon split rings 87 and 89. After intermediate plate cylinders 86 rest upon split rings 87 and 89, lower plate 31 is lowered still further to the position shown in FIG. 2.

It will now be evident from FIG. 2 that access to vending machines 22 to 25 may be obtained when stand 21 is opened, as shown in FIG. 2. The vending machines 22 to 25 may then be completely removed from stand 21 for service. Further, access to all of the vending machines may be obtained at the same time because upper ends 28 of machine receptacles 27 are opened contemporaneously.

After the vending machines have been serviced, they may again be replaced in the stand 21 as shown in FIG. 2 and the stand closed by rotating channel 62 from the position shown in FIG. 7 to the position shown in FIG. 6. Again, channel 62 is locked in the position shown in FIG. 6 by turning key 71 in lock 68 to place eccentric plate 70 behind cross bar 58.

From the foregoing, it will be appreciated that the dispensing apparatus of the present invention indicated at 20 in FIG. 1 may be operated to open the receptacles 27 of all four of the vending machines 22 to 25 contemporaneously. Further, the opening of the receptacles 27 of the vending machines also make the vending machines independently accessible from stand 21. This makes it possible to service the machines 22 to 25 more easily and more rapidly. However, in the locked position shown in FIG. 1, the merchandise in receptacle 27 and vending machines 22 to 25 themselves are pilfer proof.

From the foregoing, it will also be appreciated that the device of the present invention is economical to manufacture.

Servicing is both easier and more efficient to perform. Further, note will be taken that an upper and lower machine may be locked in stand 21 without the necessity of all four of the machines 22 to 25 being located therein.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In dispensing apparatus, the combination comprising: a stand; at least first and second vending machines, each of said machines having a receptacle open at its upper end; an upper horizontal plate fixed to the upper end of said stand; an intermediate horizontal plate movable vertically on said stand below said upper plate; a lower horizontal plate movable vertically on said stand below said intermediate plate; stop means to limit downward vertical movement of said intermediate plate on said stand; at least a first vending machine on said intermediate plate, said first machine having an open receptacle at its upper end, said stop means being spaced from said upper plate a distance large enough to permit removal of said first machine from the space between said upper and intermediate plates when said intermediate plate rests upon said stop means; at least a second vending machine on said lower plate, said second machine also having an open receptacle at its upper end; and releasable means to place said lower plate in an upper position such that said first machine is held in a position between said upper and intermediate plates so that said first machine cannot be removed from the said space therebetween and said second machine is held between said intermediate and lower plates so that said second machine cannot be removed from the said space therebetween.

2. In dispensing apparauts, the combination comprising: a base; a pair of vertical parallel posts fixed to said base, said posts having circular cross sections; an upper horizontal plate fixed to the upper ends of said posts; an intermediate horizontal plate, said intermediate plate having a pair of cylindrical ears to slide vertically on said posts below said upper plate; a lower plate having a pair of cylindrical ears to slide vertically on said posts below said upper plate; stop means on said posts between said intermediate and lower plates to limit downward vertical movement of said intermediate plate; at least a first vending machine on said intermediate plate, said first machine having an open receptacle at its upper end, said stop means being spaced from said upper plate a distance large enough to permit removal of said first machine from the space between said upper and intermediate plates when said intermediate plate rests upon said stop means; at least a second vending machine on said lower plate, said second machine also having an open receptacle at its upper end; and releasable means to place said lower plate in an upper position such that said first machine is held in a position between said upper and intermediate plates so that said first machine cannot be removed from the said space therebetween, and said second machine is held between said intermediate and lower plates so that said second machine cannot be removed from the said space therebetween, said upper plate having a downwardly extending flange to fit contiguous to and around the upper edge of the receptacle of said first machine, said intermediate plate having an upwardly extending flange to fit contiguous to and around the lower edge of said first machine, said intermediate plate also having a downwardly extending flange to fit contiguous to and around the upper edge of the receptacle of said second machine, said lower plate having an upwardly extending flange to fit contiguous to and around the lower edge of said second machine.

3. In dispensing apparatus, the combination comprising: a base; a pair of wheels rotatably mounted on said base; a pair of vertical parallel posts fixed to said base; an upper horizontal plate fixed to the upper ends of said posts; intermediate and lower horizontal plates slidable vertically on said posts; stop means on said posts between said intermediate and lower plates to limit downward vertical movement of said intermediate plate; at least a first vending machine on said intermediate plate, said first machine having an open receptacle at its upper end, said stop means being spaced from said upper plate a distance large enough to permit removal of said first machine from the space between said upper and intermediate plates when said intermediate plate rests upon said stop means; at least a second vending machine on said lower plate, said second machine also having an open receptacle at its upper end; and releasable means to place said lower plate in an upper position such that said first machine is held in a position between said upper and intermediate plates so that said first machine cannot be removed from the said space therebetween, and said second machine is held between said intermediate and lower plates so that said second machine cannot be removed from the said space therebetween.

4. In dispensing apparatus, the combination comprising: a stand having a base and having guide means fixed to said base; and upper plate fixed to said stand; intermediate and lower plates slidable on said guide means below said upper plate, said lower plate being disposed below said intermediate plate; means to limit downward vertical movement of said intermediate plate; a first vending machine having a lower base to rest upon said intermediate plate and an upper receptacle with an upper open end to fit adjacent said upper plate; a second vending machine having a lower base to rest upon said lower plate and an upper receptacle with an upper open end to fit adjacent said intermediate plate; a horizontal pin in said base; means to lock said pin in said base; a first member rotatable on said pin; a second member rotatable on said first member about a horizontal axis spaced from said pin, said second member having an upper end arranged to lift said lower plate when said first member is rotated to a vertical position; and means to lock said first member in said vertical position, said machine receptacles being closed when said first member is in said vertical position, said machine receptacle otherwise being open.

5. In dispensing apparatus, the combination comprising: a stand having a base and having guide means fixed to said base; an upper plate mounted on said stand; a lower plate slidable on said guide means below said upper plate; a vending machine having a lower base to rest on said lower plate and an upper receptacle with an upper open end to fit adjacent said upper plate; a first member having one end pivoted about a first horizontal axis on said base; a second member rotatable on said first member about a second horizontal axis spaced from said first axis, said second member having an upper end arranged to lift said lower plate when said first member is rotated to a vertical position; and means to lock said first member in said vertical position, said vending machine being closed when said first member is in said vertical position, said machine receptacle otherwise being open.

6. In dispensing apparatus, the combination comprising: a stand having a base and having guide means fixed to said base; an upper plate fixed to said stand; intermediate and lower plates slidable on said guide means below said upper plate, said lower plate being disposed below said intermediate plate; means to limit downward vertical movement of said intermediate plate; a first vending machine having a lower base to rest upon said intermediate plate and an upper receptacle with an upper open end to fit adjacent said upper plate; a second vending machine having a lower base to rest upon said lower plate and an upper receptacle with an upper open end to fit adjacent said intermediate plate; a first member having one end pivoted about a first horizontal axis on said base; a second member rotatable on said first member about a second horizontal axis spaced from said first axis, said second member having an upper end arranged to lift said lower plate when said first member is rotated to a vertical position; and means to lock said first member in said vertical position, said machine receptacle being closed when said first member is in said vertical position, said machine receptacles otherwise being open.

7. In dispensing apparatus, the combination comprising a stand having a base and having guide means fixed to said base; an upper plate mounted on said stand; a lower plate slidable on said guide means below said upper plate, said lower plate having a central groove extending between said guide means; a vending machine having a lower base to rest on said lower plate and an upper receptacle with an upper open end to fit adjacent said upper plate; a first member having one end pivoted about a first horizontal axis on said base; a second member rotatable on said first member about a second horizontal axis spaced from said first axis, said second member having an upper end arranged to lift said lower plate when said first member is rotated to a vertical position, said second member having a T-shaped upper end with the cross of the T in said lower plate groove; and means to lock said first member in said vertical position, said vending machine being closed when said first member is in said vertical position, said machine receptacle otherwise being open.

8. In dispensing apparatus, the combination comprising: a stand having a base and a pair of vertical posts fixed to said base; upper, intermediate and lower plates, at least one of said upper and lower plates being slidable vertical on said posts, said intermediate plate also being slidable vertically on said posts; a first vending machine between said lower and intermediate plates; a second vending machine between said intermediate and upper plates, each of said machines having an upper receptacle open at its upper end and a lower base, said lower plate having upwardly extending flanges to fit around the base of said first vending machine, said intermediate plate having downwardly extending flanges to fit around the receptacle of said first vending machine, said intermediate plate having upwardly extending flanges to fit around the base of said second vending machine, said upper plate having downwardly extending flanges to fit around the receptacle of said second vending machine; and means to lock said plates in predetermined positions contiguous to said machines, said plate flanges thereby preventing removal of said machines from between said plates when said plates are locked in said predetermined positions.

9. In dispensing apparatus, the combination comprising: a stand having a base and guide means fixed to said base; upper, intermediate and lower plates, at least one of said upper and lower plates being slidable vertically on said guide means, said intermediate plate also being slidable vertically on said guide means; a first vending machine between said lower and intermediate plates; a second vending machine between said intermediate and upper plates; each of said machines having an upper receptacle open at its upper end and a lower base, said lower plate having upwardly extending flanges to fit around the base of said first vending machine, said intermediate plate having downwardly extending flanges to fit around the receptacle of said first vending machine, said intermediate plate having upwardly extending flanges to fit around the base of said second vending machine, said upper plate having downwardly extending flanges to fit around the receptacle of said second vending machine; and means to lock said plates in predetermined positions contiguous to said machines, said plate flanges thereby preventing removal of said machines from between said plates when said plates are locked in said predetermined positions.

References Cited by the Examiner
UNITED STATES PATENTS

| | | | |
|---|---|---|---|
| 825,098 | 7/1906 | Wolf | 312—199 |
| 1,194,436 | 8/1916 | Smith | 312—250 |
| 1,820,268 | 8/1931 | Cleveland | 287—62 |
| 2,537,317 | 1/1951 | Probasco | 222—153 |
| 2,819,938 | 1/1958 | Zerver | 312—201 |

OTHER REFERENCES

Siemens et al.: German application 1,125,982, printed Mar. 22, 1962.

CHANCELLOR E. HARRIS, *Acting Primary Examiner.*